US010457422B2

(12) United States Patent
Littlejohn et al.

(10) Patent No.: US 10,457,422 B2
(45) Date of Patent: Oct. 29, 2019

(54) WEIGHTS FOR WATER IMMERSION TESTING

(71) Applicant: Sikorsky Aircraft Corporation, Stratford, CT (US)

(72) Inventors: David W. Littlejohn, Haslet, TX (US); Sven R. Lofstrom, Irving, TX (US); Scott O. Smith, Bedford, TX (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 6 days.

(21) Appl. No.: 15/371,748

(22) Filed: Dec. 7, 2016

(65) Prior Publication Data

US 2018/0155062 A1   Jun. 7, 2018

(51) Int. Cl.
*B64F 5/10* (2017.01)
*B64F 5/60* (2017.01)
*F16M 11/04* (2006.01)
*B64C 3/56* (2006.01)
*B64C 27/50* (2006.01)
*B64C 27/46* (2006.01)
*B64C 27/32* (2006.01)
*B64C 27/00* (2006.01)
*F16M 13/04* (2006.01)
*B23Q 3/06* (2006.01)

(52) U.S. Cl.
CPC ................ *B64F 5/10* (2017.01); *B64C 3/56* (2013.01); *B64C 27/006* (2013.01); *B64C 27/322* (2013.01); *B64C 27/46* (2013.01); *B64C 27/50* (2013.01); *B64F 5/60* (2017.01); *F16M 11/041* (2013.01); *F16M 13/04* (2013.01); *B23Q 3/063* (2013.01)

(58) Field of Classification Search
CPC ......... B64C 3/56; B64C 27/006; B64C 27/46; B64C 27/50; B64C 27/322; B23Q 3/063; B64F 5/10
USPC ... 248/229.13, 229.23, 228.4, 230.4, 231.51, 248/316.5, 276.1, 288.11, 613, 614; 244/17.11
See application file for complete search history.

(56) References Cited

U.S. PATENT DOCUMENTS 2,851,235 A * 9/1958 Henig ...................... F41A 9/87
                                                              280/79.6
2,986,422 A * 5/1961 Renfroc ................... B66C 1/48
                                                              294/101

(Continued)

FOREIGN PATENT DOCUMENTS

EP   2276923 B1 * 11/2011 ................ B60P 3/40
EP   2947311 A1 * 11/2015 ................ B60P 3/40

(Continued)

*Primary Examiner* — Eret C McNichols
(74) *Attorney, Agent, or Firm* — Cantor Colburn LLP

(57) ABSTRACT

A method and apparatus for securing a rotor blade is disclosed. The apparatus includes a base and an offset member configured to maintain the base at a selected distance from a set point. A clamping member is supported by the base and is receptive of the rotor blade at a selected location of the rotor blade, wherein the rotor blade is positioned against the set point. A slidable component supports the clamping member and slides the clamping member within the base to the selected location of the rotor blade. The free end of the clam shell assembly can be secured to a support beam that raises the clam shell assembly and rotor blade from the base for immersion testing.

15 Claims, 3 Drawing Sheets

(56) References Cited

U.S. PATENT DOCUMENTS

| | | | | |
|---|---|---|---|---|
| 3,133,715 | A * | 5/1964 | Grunfelder | B64C 27/50 244/17.11 |
| 4,301,982 | A * | 11/1981 | Tiemann | B64C 27/50 244/17.11 |
| 4,623,300 | A * | 11/1986 | Ruzicka | B64C 27/50 244/7 A |
| 4,818,004 | A * | 4/1989 | Oswalt | B66C 1/10 294/67.21 |
| 4,821,990 | A * | 4/1989 | Porter | F16M 13/02 248/231.51 |
| 4,995,146 | A * | 2/1991 | Woods | B25B 5/003 269/45 |
| 5,211,538 | A * | 5/1993 | Seghal | B64C 27/50 244/17.11 |
| 5,317,901 | A | 6/1994 | Khan | |
| 5,772,269 | A * | 6/1998 | Henning, Jr. | B66C 1/16 294/67.22 |
| 6,068,541 | A * | 5/2000 | Dwyer | B23Q 3/063 269/296 |
| 6,287,182 | B1 * | 9/2001 | Dwyer | B23Q 3/063 269/296 |
| 6,568,644 | B2 * | 5/2003 | Pedersen | B62J 7/08 224/309 |
| 6,681,971 | B2 * | 1/2004 | Laverack | B60R 9/045 224/319 |
| 6,769,644 | B2 * | 8/2004 | Muylaert | B64C 27/50 244/17.11 |
| 6,793,186 | B2 * | 9/2004 | Pedersen | B60R 9/048 224/309 |
| 7,207,519 | B2 * | 4/2007 | Hoynash | B64C 3/56 244/17.11 |
| 7,980,522 | B2 * | 7/2011 | Anderson | B25B 5/14 244/17.11 |
| 8,366,360 | B2 * | 2/2013 | Krogh | B60P 3/40 410/44 |
| 8,783,636 | B2 * | 7/2014 | Okita | F16M 11/041 24/303 |
| 9,138,971 | B2 * | 9/2015 | Jones | B29C 70/46 |
| 9,205,522 | B2 * | 12/2015 | Chacon | B23Q 3/063 |
| 9,285,068 | B2 * | 3/2016 | Phelan | F16M 9/00 |
| 9,463,541 | B2 * | 10/2016 | Sherrill | B23Q 3/064 |
| 9,475,677 | B2 * | 10/2016 | Hansen | B66C 1/108 |
| 9,522,626 | B2 * | 12/2016 | Hansen | F03D 13/40 |
| 9,689,378 | B2 * | 6/2017 | Thomsen | B60P 3/40 |
| 2005/0019166 | A1 * | 1/2005 | Bervang | B66C 1/108 416/244 A |
| 2011/0048111 | A1 | 3/2011 | Vontell | |
| 2011/0284327 | A1 * | 11/2011 | Crayton | E04G 3/24 182/150 |
| 2014/0193255 | A1 * | 7/2014 | Hancock | F03D 7/022 416/1 |
| 2014/0314576 | A1 * | 10/2014 | Lieberknecht | F01D 5/32 416/220 R |
| 2015/0028608 | A1 * | 1/2015 | Wubbelmann | B66C 1/447 294/81.2 |
| 2015/0192104 | A1 * | 7/2015 | Lulker | F03D 1/005 206/493 |
| 2015/0225077 | A1 * | 8/2015 | Dunmire | B64C 27/50 248/316.5 |
| 2015/0354388 | A1 * | 12/2015 | Cheah | F01D 11/006 415/173.1 |
| 2015/0369209 | A1 * | 12/2015 | Datta | B60P 3/40 211/85.8 |
| 2016/0258422 | A1 * | 9/2016 | Sigurdsson | F03D 13/40 |
| 2017/0074239 | A1 * | 3/2017 | Caruso | F03D 1/0675 |
| 2017/0138715 | A1 * | 5/2017 | Higbie | G01B 3/004 |
| 2017/0253167 | A1 * | 9/2017 | Gill, III | B60P 3/00 |
| 2018/0044039 | A1 * | 2/2018 | Lofstrom | B64F 5/10 |
| 2018/0093782 | A1 * | 4/2018 | Lofstrom | B64F 5/10 |

FOREIGN PATENT DOCUMENTS

| | | | |
|---|---|---|---|
| JP | 2671531 B2 * | 10/1997 | B23Q 3/063 |
| JP | 2000176766 A * | 6/2000 | B23Q 3/063 |
| JP | 4287933 B2 * | 7/2009 | B23Q 3/063 |

* cited by examiner

WEIGHTS FOR WATER IMMERSION TESTING

BACKGROUND OF THE INVENTION

The present invention is directed to an apparatus and method for performing a fluid immersion test for a rotor blade and, in particular, to an apparatus that prepares the rotor blade for handling during a fluid immersion test.

A rotor blade for a rotary wing aircraft is often tested during manufacture or maintenance procedures in order to ensure that the rotor blade is resistant to water leakage. In order to perform this test, the rotor blade is placed in a harness and the harness is lowered into a fluid tank, generally a tank of water. The harness generally covers a surface of the rotor blade while the rotor blade is immersed in the fluid tank, thereby preventing the covered surface from being adequately tested. Thus, the fluid immersion test is generally a two-step process, wherein the harness holds the rotor blade at two different locations during two separate immersions. Configuring the harness with respect to the rotor blades is an unwieldy process. Additionally, rotor blades can be relatively buoyant, requiring to be weighted in order to be completely submerged in the fluid in the water. Accordingly, it is desirable to provide a method and/or an apparatus for preparing the rotor blade so that the rotor blade can be easily lowered into a fluid tank for immersion testing.

SUMMARY OF THE INVENTION

According to one embodiment of the present invention, an apparatus for securing a rotor blade includes: a base; an offset member configured to maintain the base at a selected distance from a set point; a clamping member supported by the base and receptive of the rotor blade at a selected location of the rotor blade; and a slidable component that supports the clamping member and slides the clamping member within the base to the selected location of the rotor blade.

According to another embodiment of the present invention, a method of preparing a rotor blade for immersion testing includes: arranging a base at a selected location from a set point, the base including a clam shell assembly supported by the base; receiving the rotor blade at the clam shell assembly, wherein the rotor blade is positioned against the set point; securing the free end of the clam shell assembly to a support beam; and raising the clam shell assembly and rotor blade from the base for immersion testing.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
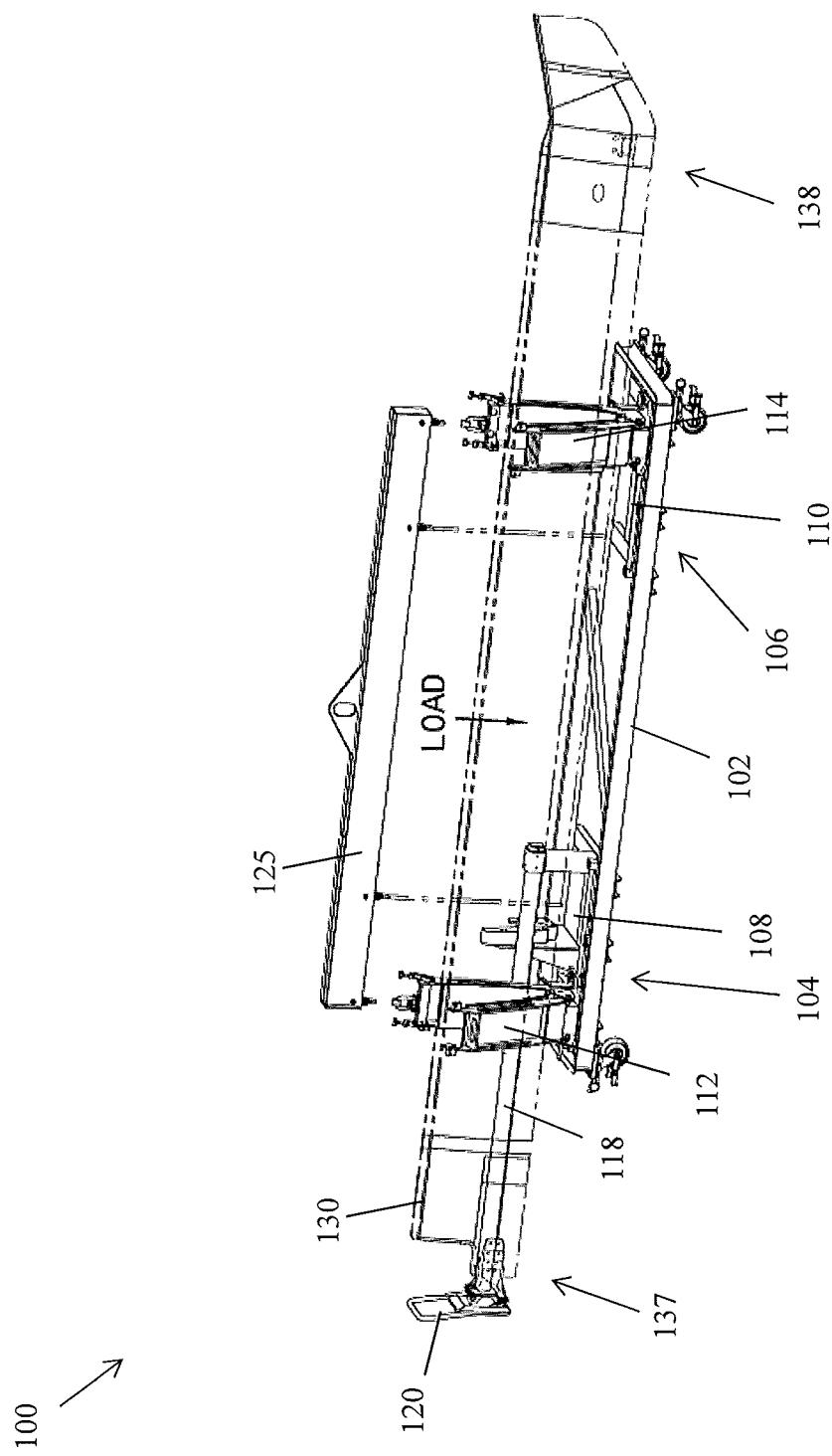
FIG. 1 shows an apparatus for preparing a rotor blade for immersion testing in one embodiment of the present invention.

Referring now to the Figures, where the invention will be described with reference to specific embodiments, without limiting same, FIG. 1 shows an apparatus 100 for preparing a rotor blade 130 for immersion testing in one embodiment of the present invention. The apparatus 100 includes a base 102 which, in one embodiment, can be a cart having wheels for moving the base 102 around. The base 102 has a length and a width. The length of the base 102 is aligned along a length of the rotor blade 130 (i.e., a distance from a root 137 of the rotor blade 130 to a tip 138 of the rotor blade 130) when preparing the rotor blade 130 for immersion testing. The base 102 includes a first nesting tray 104 located at one end of the base 102 and a second nesting tray 106 located at an opposite end of the base 102 along the length. The first nesting tray 104 includes a first slidable component 108 that slides within the first nesting tray 104 along the length of the base 102. Similarly, the second nesting tray 106 includes a second slidable component 110 that slides within the second nesting tray 106 along the length of the base 102. The first slidable component 108 and the second slidable component 110 move along a same line of motion along the length of the base 102. The first nesting tray 104 may include one or more marks or notches that allow the first slidable component 108 to be set at one or more specific locations within the first nesting tray 104. Similarly, the second nesting tray 106 may include one or more marks or notches that allow the second slidable component 110 to be set at one or more specific locations within the second nesting tray 106. At these one or more specific locations, the first slidable component 108 and second slidable component 110, as well as devices conveyed by the first slidable component 108 and second slidable component 110, are located at specified distances from a center of gravity (indicated by 'LOAD' in FIG. 1) of the rotor blade 130 as discussed below. The first slidable component 108 and the second slidable component 110 can include a securing device to secure and release the first and second slidable components 108 and 110 to their respective nesting trays 104 and 106 at these specified locations or at other locations.

The first slidable component 108 provides support for a first clam shell assembly 112 and the second slidable component 110 provides support for a second clam shell assembly 114. Each of the first and second clam shell assemblies 112 and 114 are usable as a clamp or vise in order to grip an object placed therein. The first clam shell assembly 112 and second clam shell assembly 114 can be attached and detached from their respective slidable components 108 and 110. To prepare a rotor blade 130 for immersion testing, the clam shell assemblies 112 and 114 are attached within the base 102 with free ends of the clam shell assemblies 112 and 114 facing upwards. The rotor blade 130 is deposited into the free ends and the sides of the clam shell assemblies 112 and 114 are closed against the rotor blade 130 and are secured to each other and to a support beam 125. The support beam 125 transports the rotor blade 130 from the base 102 into a fluid immersion tank. While the invention is discussed in terms of clam shell assemblies 112 and 114, other types of clamping member, such as grips, clamps or vises that selectively grip an object can be used in alternate embodiments. Details of the clam shell assemblies 112 and 114 are discussed below with respect to FIG. 2.

Figure 2:
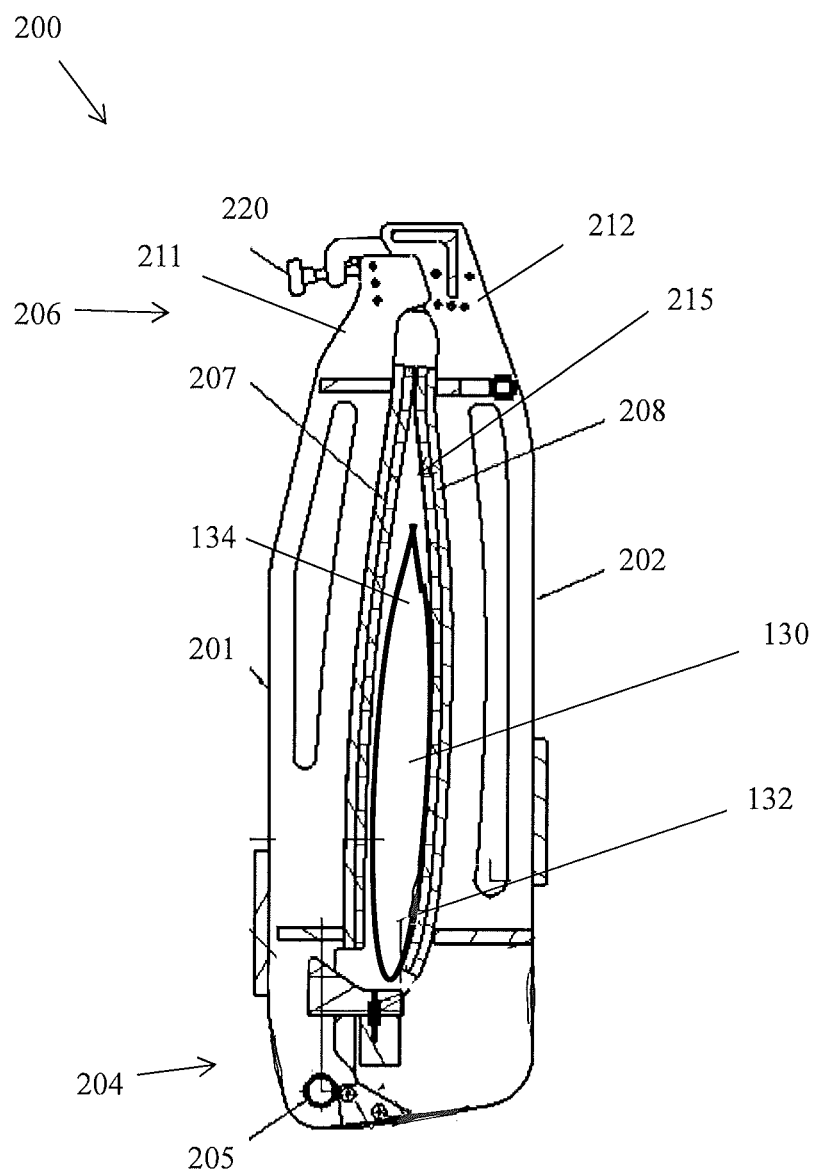
FIG. 2 shows a side view of a clam shell assembly of the apparatus of FIG. 1.

FIG. 2 shows a side view of a clam shell assembly 200, such as the first clam shell assembly 112 and second clam shell assembly 114 in FIG. 1. The clam shell assembly 200 includes two sides 201 and 202 that are connected at a hinged end 204 by a hinge 205. Free end 206, opposite the hinged end 204, can be either open or closed. The clam shell assembly 200 is supported on the slidable component by placing the hinged end 204 on the slidable component with the free end 206 facing upward and away from the base 102. The hinged end 204 can be removably secured to the slidable component used suitable latches, etc. The upwardly-facing free end 206 receives the rotor blade 130. At the hinged end 204, side 201 includes pad 207 on its inner surface and side 202 includes pad 208 on its inner surface. Pads 207 and 208 support the leading edge 132 of the rotor blade 130 so that the leading edge 132 is prevented from being damaged by the hinged end 204 of the clam shell assembly 200. At the free end 206, side 201 includes a latch assembly 211 and side 202 includes a latch assembly 212. A support member 220 secures latch assembly 211 to latch assembly 212 in order to secure the rotor blade 130 within the clam shell assembly 200. The support member 220 also secures the latch assemblies 211 and 212 to the support beam (125, FIG. 1). When the support member 220 has secured the latch assemblies 211 and 212, a space 215 is formed between the support member 220 and the trailing edge 134 of the rotor blade 130. The space 215 is large enough to prevent contact between the support member 220 and the trailing edge 134 of the rotor blade 130 that would otherwise damage the trailing edge 134. In alternate embodiments, the latch assemblies 211 and 212 can couple directly to each other, with one or more of the latch assemblies 211 and 212 including a device that couples to the support beam 125.

Side 201 and side 202 are weighted in order to sink a buoyant rotor blade 130 under a surface of fluid in the fluid immersion tank. In other words, the weight and/or density of the sides 201 and 202 are selected so that the combined density of the clam shell assemblies 112 and 114 and rotor blade 130 is greater than the density of the fluid, i.e., water. When the immersion test has been complete, the rotor blade 130 is carried via the support beam 125 back to its location at the base 102.

Returning to FIG. 1, the base 102 includes an offset member 118 that is used to place and maintain the base 102 at a selected distance from a set point 120. The offset member 118 can be a rod of a selected length or other solid member usable for marking a distance. The set point 120 can be a location at a wall or other secured location. The offset member 118 is fixedly secured into the base 102 and is also placed against the set point 120 to offset the base 102 from the set point 120 by the selected distance. The offset member 118 can be selected to have a length that is suitable for the type and length of the rotor blade 130 being tested. Also, the offset member 118 can be removably secured to the base 102 in order to provide the proper offset for a variety of rotor blades.

The length of the offset member 118 is generally selected so that, when the base 102 is separated from the set point 120 by the offset member 118 and the rotor blade 130 is lowered into the clam shell assemblies 112 and 114 with the root 137 of the rotor blade 130 placed against the set point 120, a center of gravity of the rotor blade 130 lies at a midpoint between the clam shell assemblies 112 and 114. In one embodiment, the center of gravity of the rotor blade 130 can be placed at a midpoint of the length of the base 102 when the base 102 is offset from the set point 120 by the offset member 118. The clam shell assemblies 112 and 114 can also be arranged so that the distance between the first clam shell assembly 112 and the center of gravity of the rotor blade 130 is the same as the distance between the second clam shell assembly 114 and the center of gravity of the rotor blade 130. Therefore, when the first clam shell assembly 112 is moved toward the center of gravity of the rotor blade 130 by a selected distance, the second clam shell assembly 114 is also moved toward the center of gravity of the rotor blade 130 by the selected distance. Similarly, when the first clam shell assembly 112 is moved away from the center of gravity of the rotor blade 130 by a selected distance, the second clam shell assembly 114 is also moved away from the center of gravity of the rotor blade 130 by the selected distance. Thus, the center of gravity of the rotor blade 130 is always at a midpoint between the clam shell assemblies 112 and 114 regardless of where the clam shell assemblies 112 and 114 are eventually secured to the rotor blade 130.

The immersion test is performed by lifting the rotor blade 130 off of the base 102 by the clam shell assemblies 112 and 114 and lowering the rotor blade 130 with the clam shell assemblies 112 and 114 into a fluid such as water. The immersion test is performed at least twice, with each test being performed with the clam shell assemblies 112 and 114 secured to the rotor blade 130 at different locations along the rotor blade 130. In this way, a section or surface of the rotor blade 130 that is covered by the clam shell assemblies 112 and 114 during one test is left uncovered during the second test. In this manner, the entire surface of the rotor blade 130 can be submitted to a fluid immersion test.

Figure 3:
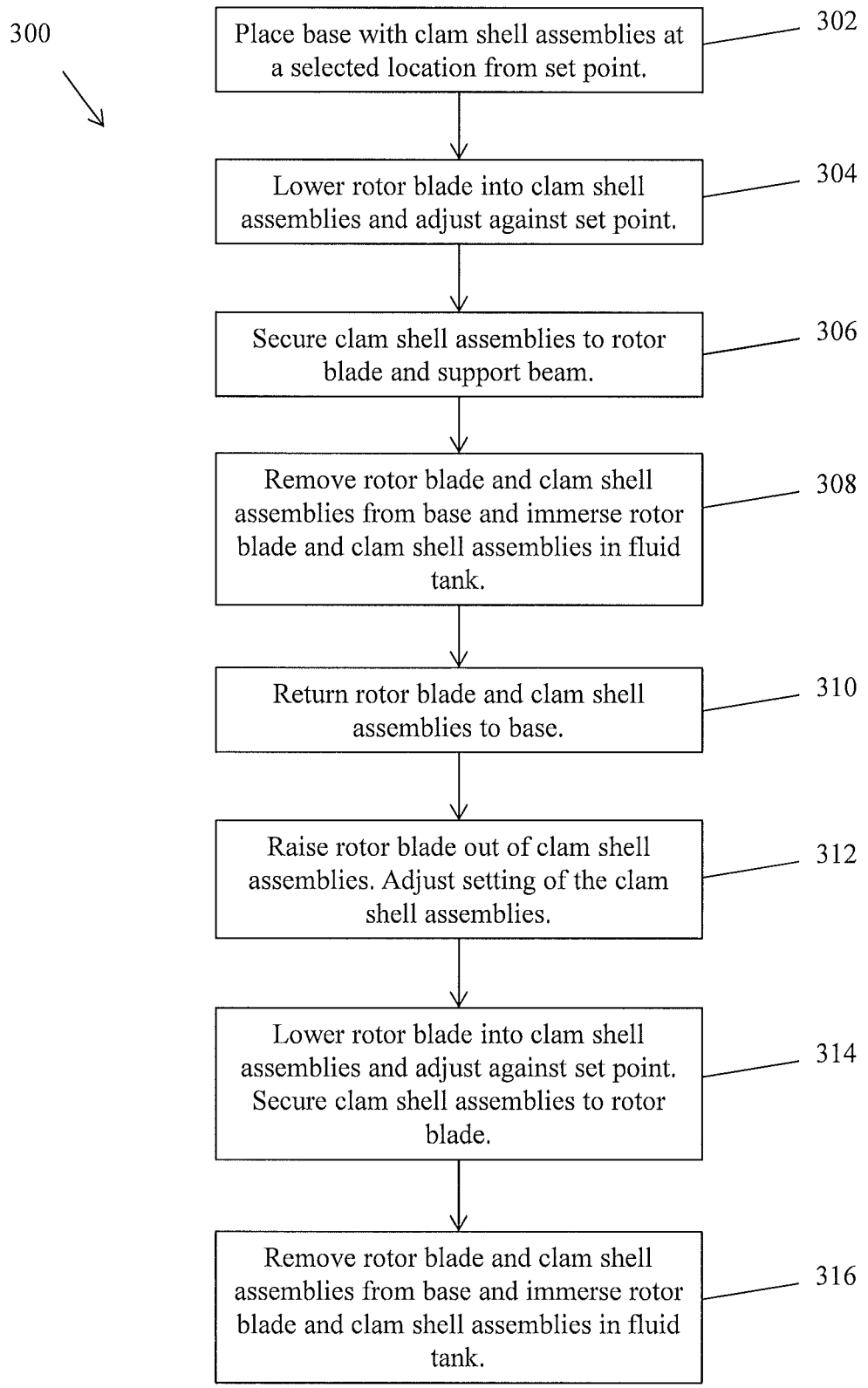
FIG. 3 shows a flowchart illustrating a method for performing an immersion test using the apparatus disclosed herein.

FIG. 3 shows a flowchart 300 illustrating a method for performing an immersion test using the apparatus disclosed herein. In box 302, the base 102 is placed at a selected offset location from the set point 120 by a selected distance using the offset member 118. The first and second clam shell assemblies 112 and 114 are placed in an open configuration at a first location setting within the base 102. The first location setting is such that the center of gravity of the rotor blade 130 is at a midpoint between the first and second clam shell assemblies 112 and 114 when the rotor blade 130 is placed in the first and second clam shell assemblies 112 and 114. In box 304, the rotor blade 130 is lowered into the clam shell assemblies 112 and 114 and positioned by placing root 137 against set point 120. In box 306, the clam shell assemblies 112 and 114 are secured around the rotor blade 130 and secured to support beam 125. In box 308, the support beam 125 is raised to lift the rotor blade 130 and clam shell assemblies 112 and 114 from the base 102 and to place the rotor blade 130 and clam shell assemblies 112 and 114 into a fluid immersion tank. The weighted clam shell assemblies 112 and 114 help to submerge the rotor blade 130 in the fluid immersion tank due to their weight and density. In box 310, after a first fluid immersion test is performed, the rotor blade 130 is returned to the base 102 and the support beam 125 is disengaged from the clam shell assemblies 112 and 114, which subsequently open to release the rotor blade 130. In box 312, the rotor blade 130 is returned to the set point 120 and raised upward out of the clam shell assemblies 112 and 114. The clam shell assemblies 112 and 114 are then moved in their respective nesting trays 104 and 106 from their first location setting in the base 102 to a second location setting in the base 102. At the second location setting, the center of gravity of the rotor blade 130 remains at a midpoint between the clam shell assemblies 112 and 114 and the portions of the rotor blade 130 that were covered by the clam shell assemblies 112 and 114 during the first immersion test are left uncovered during the second immersion test. In box 314, the rotor blade 130 is lowered back into the clam shell assemblies 112 and 114. In box 316, the clam shell assemblies 112 and 114 are secured around the rotor blade 130 and to the support beam 125. The support beam 125 is used to lift the rotor blade 130 and clam shell assemblies 112 and 114 from the base 102 and into the fluid immersion tank for a second immersion test. After the second immersion test, the rotor blade 130 can be returned to the base 102, and the support beam can be detached from the clam shell assemblies 112 and 114 so that the rotor blade 130 can be removed from the clam shell assemblies 112 and 114.

While the apparatus disclosed herein is used to prepare a rotor blade for a fluid immersion test, the apparatus can also be used secure components other than rotor blades for processes besides immersion testing.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. An apparatus for securing a rotor blade, comprising:
   a base having a length alignable along a length of the rotor blade, the rotor blade positioned against a set point;
   a first slidable component configured to slide within the base along the direction of the length of the base;
   a first clam shell assembly supported by the first slidable component and receptive of the rotor blade at the selected location of the rotor blade;
   a second slidable component configured to slide within the base along the direction of the length of the base;
   a second clam shell assembly supported by the slidable component and receptive of the rotor blade; and
   an offset member secured to the base and configured to maintain the base at a distance from a set point for receiving the rotor blade at the first clam shell assembly and the second clam shell assembly, wherein a length of the offset member is selected to place a center of gravity of the received rotor blade at a midpoint between the first clam shell assembly and the second clam shell assembly.

2. The apparatus of claim 1, wherein the first slidable component and the second slidable component are selectively securable to the base.

3. The apparatus of claim 1, wherein the first clam shell assembly is removably coupled to the first slidable component and the second clam shell assembly is removably coupled to the second slidable component.

4. The apparatus of claim 1, wherein the first clam shell assembly is removably coupled to the first slidable component at a hinged end of the first clam shell assembly and the second clam shell assembly is removably coupled to the second slidable component at a hinged end of the second clam shell assembly.

5. The apparatus of claim 4, wherein a free end of the first clam shell assembly includes a latch assembly configured to secure the first clam shell assembly in a closed position and a free end of the second clam shell assembly includes a latch assembly configured to secure the second clam shell assembly in a closed position.

6. The apparatus of claim 5, wherein at least one of the first clam shell assembly and the second clam shell assembly is receptive to a leading edge of the rotor blade at the hinged end of the at least one of the first clam shell assembly and the second clam shell assembly and wherein a length of a side of the at least one of the first clam shell assembly and the second clam shell assembly is selected so that a space is formed between a trailing edge of the rotor blade and latch assemblies at the free end of the at least one of the first clam shell assembly and the second clam shell assembly when the latch assemblies are secured to a support beam.

7. The apparatus of claim 1, wherein the rotor blade is attached to the set point at a root of the rotor blade.

8. The apparatus of claim 1, wherein the first clam shell assembly and the second clam shell assembly have a density selected to submerge the rotor blade in water when the first clam shell assembly, second clam shell assembly and rotor blade are placed in the water.

9. The apparatus of claim 1, wherein the offset member is a rod.

10. A method of preparing a rotor blade for immersion testing, comprising:
    positioning the rotor blade against a set point;
    arranging a base at a selected distance from the set point at a secured location off of the base with a length of the base aligned along a length of the rotor blade, the base including a first clam shell assembly slidable within the base and a second clam shell assembly slidable within the base, wherein the selected distance places a center of gravity of the rotor blade positioned against the set point at a midpoint between the first and second clam shell assemblies of the base;
    receiving the rotor blade at the first clam shell assembly and the second clam shell assembly such that the center of gravity of the rotor is placed at the midpoint of the base;
    placing the first clam shell assembly and the second clam shell assembly at locations equidistant from the center of gravity of the rotor blade;
    securing the free ends of the first clam shell assembly and the second clam shell assembly to a support beam; and
    raising the first clam shell assembly, second clam shell assembly and rotor blade from the base for immersion testing.

11. The method of claim 10, further comprising arranging the base at the selected location from the set point using an offset member having a selected length.

12. The method of claim 11, wherein the length of the offset member is selected to place the center of gravity of the rotor blade at a midpoint between the pair of clam shell assemblies when the rotor blade is received at the clam shell assemblies while positioned against the set point.

13. The method of claim 12, further comprising locating the first clam shell assembly and the second clam shell assembly so that the center of gravity of the received rotor blade is at the midpoint between the first clam shell assembly and second clam shell assembly.

14. The method of claim 10, further comprising receiving a leading edge of the rotor blade at a hinged end of the first clam shell assembly and second clam shell assembly.

15. The method of claim 10, further comprising securing latch assemblies of the first clam shell assembly and second clam shell assembly to the support beam so that a space is formed between a trailing edge of the rotor blade and the latch assemblies.

* * * * *